US008791617B2

(12) United States Patent
Stiesdal

(10) Patent No.: US 8,791,617 B2
(45) Date of Patent: Jul. 29, 2014

(54) ARRANGEMENT TO ENSURE AN AIR GAP IN AN ELECTRIC MACHINE

(71) Applicant: Henrik Stiesdal, Odense C (DK)

(72) Inventor: Henrik Stiesdal, Odense C (DK)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 13/963,277

(22) Filed: Aug. 9, 2013

(65) Prior Publication Data

US 2013/0320682 A1 Dec. 5, 2013

Related U.S. Application Data

(62) Division of application No. 12/960,755, filed on Dec. 6, 2010, now Pat. No. 8,536,753.

(30) Foreign Application Priority Data

Dec. 8, 2009 (EP) .................................... 09015205

(51) Int. Cl.
H02K 1/00 (2006.01)

(52) U.S. Cl.
USPC ........................................................ 310/193

(58) Field of Classification Search
USPC ................ 310/193, 216.092; 290/1 R, 44, 55
See application file for complete search history.

(56) References Cited

U.S. PATENT DOCUMENTS

| 2,575,153 | A | * | 11/1951 | Wightman | 310/40 R |
| 3,171,049 | A | * | 2/1965 | Jarret et al. | 310/168 |
| 6,483,199 | B2 | | 11/2002 | Umemoto et al. | |
| 6,680,549 | B2 | * | 1/2004 | Boardman et al. | 310/52 |
| 6,700,280 | B1 | * | 3/2004 | Geiger et al. | 310/193 |
| 6,727,630 | B1 | | 4/2004 | Maslov et al. | |
| 6,903,485 | B2 | | 6/2005 | Chen | |
| 7,528,497 | B2 | * | 5/2009 | Bertolotti | 290/55 |
| 8,536,753 | B2 | * | 9/2013 | Stiesdal | 310/193 |
| 8,558,426 | B2 | * | 10/2013 | Stiesdal | 310/156.38 |
| 2003/0080636 | A1 | | 5/2003 | Chila | |
| 2004/0232799 | A1 | | 11/2004 | Chen | |
| 2006/0152014 | A1 | | 7/2006 | Bagepalli | |
| 2008/0012346 | A1 | | 1/2008 | Bertolotti | |
| 2011/0133479 | A1 | | 6/2011 | Stiesdal | |
| 2011/0133586 | A1 | | 6/2011 | Stiesdal | |
| 2011/0140566 | A1 | | 6/2011 | Hattori | |

FOREIGN PATENT DOCUMENTS

| CN | 101090211 A | 12/2007 |
| DE | 1613289 A1 | 1/1971 |
| DE | 20110520 U1 | 2/2002 |
| DE | 102004028746 A1 | 12/2005 |

(Continued)

Primary Examiner — Hanh Nguyen

(57) ABSTRACT

An arrangement to ensure an air gap in an electrical machine is provided. The electrical machine has a stator arrangement and a rotor arrangement, wherein an air gap is defined by a distance between parts of the rotor arrangement and parts of the stator arrangement. A cross section of the air gap changes along the certain length. The stator arrangement includes a stator support structure and a lamination stack, wherein the stator support structure has support elements for a two-sided support of the lamination stack, the support elements being ring-shaped and connected via a single main bearing to the rotor arrangement. Elements of the ring-shaped support element show different diameters in reference to the longitudinal axis. A first diameter of a first element of the ring-shaped support element is greater than a second diameter of a second element of the ring-shaped support-element.

7 Claims, 4 Drawing Sheets

(56) References Cited

FOREIGN PATENT DOCUMENTS

| | | |
|---|---|---|
| DE | 102004033257 A1 | 1/2006 |
| EP | 1586769 A2 | 10/2005 |
| EP | 1641102 A1 | 3/2006 |
| EP | 1710432 A1 | 10/2006 |
| EP | 1925820 A1 | 5/2008 |
| GB | 1201637 A | 8/1970 |
| GB | 1263707 A | 2/1972 |
| WO | WO 02057624 A1 | 7/2002 |
| WO | WO 2005075822 A1 | 8/2005 |
| WO | WO 2009091248 A2 | 7/2009 |

* cited by examiner

ARRANGEMENT TO ENSURE AN AIR GAP IN AN ELECTRIC MACHINE

CROSS REFERENCE TO RELATED APPLICATIONS

The present application is a divisional application of U.S. application Ser. No. 12/960,755 which claims priority of European patent application no. 09015205.9 EP filed Dec. 8, 2009. All of the applications are incorporated by reference herein in their entirety.

FIELD OF INVENTION

The invention relates to an arrangement to set up and to ensure an air gap in an electric machine in operation.

Preferably the electrical machine is a generator like a "direct drive" generator used in a wind turbine.

BACKGROUND OF INVENTION

Each generator shows an air gap, which is located between stator elements and rotor elements of the generator.

The rotor elements contain permanent magnets for example, while the stator elements contain stacked laminate plates, which support at least one winding of the stator coil.

The air gap should be relatively small to ensure a high efficiency of the generator. Thus the air gap should stay in a range of only a few millimeters. For generators, like direct drive or directly driven generators, this is very difficult due to their size. Direct drive generators show a diameter of several meters.

Rotor elements and stator elements are arranged opposite to each other, thus the air gap has to ensure that they do not come into contact while the generator is at operation. Thus the air gap should be very small to ensure the efficiency of the generator on the one hand while a certain width of the air gap is needed to prevent mechanical damages.

Especially for a direct drive generator it is difficult to keep the air gap in a range of only a few millimeters. This requires therefore very rigid, massive and heavy support structures for the stator elements and for the rotor elements.

The air gap of a generator is determined:
by tolerances of the permanent magnets, which are part of the rotor,
by tolerances of the stacked laminate-plates, which are part of the stator, and/or
by tolerances of the coil-windings, which are part of the stator-coil.

Also other elements of the generator contribute to the dimensions of the air gap. The air gap is designed in a way that the elements of the rotor and of the stator do not get in contact, while the rotor rotates around its dedicated rotational axis.

Different bearing arrangements for a direct drive generator are known. One of them is the so called "two bearing" arrangement. This arrangement is well known from document EP 1 641 102 A1 and from document U.S. Pat. No. 6,483,199 B2 for example.

According to these documents the rotor of the generator is connected to the shaft of the wind turbine. The shaft itself is supported by two bearings. The stator of the generator is attached to one side via a bearing to a so called "stationary inner shaft". Thus the rotor rotates relatively to the stator around the stationary inner shaft.

Due to the one-sided support of the stator it is difficult to keep the air gap constant or at least nearly constant. Also gravity acts on the large generator, influencing the air gap.

The rotor-components also influence the air gap due to the mass-inertia of the components. Magnetic forces, which act on the elements of the generator, and vibrations of the generator also influences the width of the air gap during the generator is at operation or at work.

The two bearing arrangement is replaced by the so called "single bearing arrangement". This technology is disclosed by the document US 2006/0152014 A1 and by the document WO 02/057624 A1 for example. A stationary inner bearing part is attached to a stationary inner shaft and a rotating outer bearing part supports the rotor of the direct drive generator.

FIG. 4 shows the "one-bearing" arrangement. A wind turbine 401 comprises a direct drive generator 402, which is arranged on the upwind side of a tower 403 of the wind turbine 401.

A tower flange 404 is arranged on the top of the tower 403. A bedplate 405 is attached to the tower flange 404. The wind turbine 401 comprises a yaw system—not shown here—which is used to turn the bedplate 405 of the wind turbine 401 around the axis Y.

The wind turbine 401 comprises a stationary shaft 406, while the shaft 406 has a centre axis A. The rear side of the stationary shaft 406 is attached to a retaining arrangement 407. On the front side of the stationary shaft 406 a stator arrangement 408 of the direct drive generator 402 is arranged.

The stator arrangement 408 comprises a stator support structure 409 and a lamination stack 410. The lamination stack 410 supports windings 411.

The stator support structure 409 comprises two support elements 412 for a two side support of the lamination stack 410. The support elements 412 are ring-shaped. They are attached to the outside of the stationary shaft 406.

A hollow cylindrical support element 413 is attached to the outer ends of the ring-shaped support elements 412. The hollow cylindrical support element 413 carries the ring-shaped lamination stack 410 and the windings 411.

A rotor arrangement 414 is arranged around the stator arrangement 408. The rotor arrangement 414 comprises a front endplate 415 and a cylinder element 417. The front endplate 415 is ring-shaped, while the cylinder element 417 is hollow. The cylinder element 417 comprises a plurality of permanent magnets 418, which are mounted on the inside of the hollow cylinder element 417. The permanent magnets 418 are arranged opposite to the lamination stack 410 and the supported windings.

An air gap 419 with a width of approximately 5 mm is located between the permanent magnets 418 and the lamination stack 410. The front endplate 415 is arranged on the stationary shaft 406 via a bearing 420. The bearing 420 is capable to transform axial loads in both directions of the centre axis A. An appropriate bearing is disclosed in DE 201 16 649 U1 for example.

The stationary part 421 of the bearing 420 is attached to the stationary shaft 406. The rotating part 422 of the bearing 420 is connected to a mounting ring 423. The front endplate 415 as well as the hub 424 are attached to the mounting ring 423. The hub 424 comprises mounting devices 425 for wind turbine rotor blades—not shown here. As shown the air gap 419 is uniform, thus a constant distance is established between the elements of the rotor and the elements of the stator.

This design is very attractive as only one bearing is used to support the rotor arrangement. On the other side the single bearing arrangement shows the same drawbacks cited above.

SUMMARY OF INVENTION

It is an object of the invention to provide an improved arrangement to set up, to adjust and to ensure an air gap in an electric machine, especially in a huge generator like the direct-drive-generator.

This object is achieved by an arrangement as claimed in the independent claim. Preferred configurations are object of the dependent claims.

The electrical machine contains a stator arrangement and a rotor arrangement. The rotor-arrangement rotates or revolves around a longitudinal axis. This axis may be the longitudinal axis of the electrical machine. At least parts of the rotor arrangement interact with parts of the stator arrangement to generate electrical power.

An air gap is defined by the distance between the parts of the rotor arrangement and the parts of the stator arrangement. The parts of the stator arrangement are opposite to the parts of the rotor arrangement along a certain length.

The cross-section of the air gap changes along this length, so the air gap is not uniform in view to the referred length.

In relation to the longitudinal axis the air gap has a rotational-geometry. Preferably the air gap is formed like a hollow truncated cone, while the axis of this truncated cone is the longitudinal axis of the generator.

As the air gap of the electrical machine is non-uniform it shows a non-uniform radial width in reference to the longitudinal axis of the electrical machine. This allows compensation of changing forces, which act on the moving components of the rotor.

Preferably the electrical machine comprises a single-bearing arrangement. This means that only one bearing is used as unilaterally support of the rotor-arrangement. The bearing connects the rotor arrangement and the stator arrangement, while the rotor arrangement shows a supported first end and preferably an unsupported second end in reference to the longitudinal axis of the electrical machine.

Preferably the electrical machine is a generator. Preferably the generator contains an outer-rotor and an inner stator, so the rotor revolves around the stator.

Preferably the generator has a stationary shaft with a centre axis. The stator arrangement is arranged on the outside of the stationary shaft. The rotor arrangement is substantially arranged around the stator arrangement. On the front side of the generator the rotor is at least indirectly supported or arranged on the stationary shaft by a main bearing.

Preferably the generator is a direct-drive-generator. Preferably the generator is used in a wind-turbine.

Due to the arrangement invented the life-time of the electrical machine is extended. The changing forces, which act via the bearing and onto the rotor, are compensated.

Also tolerances within the bearing are compensated by the arrangement according to the invention.

The width of the air gap tends to vary during the operation of the electrical machine as described above. The risk that the rotor arrangement hits the stator arrangement during the operation is reduced or even eliminated, as applied forces are taken into account by the air gap, being shaped according to the invention.

BRIEF DESCRIPTION OF THE DRAWINGS

The invention is described now in more detail by help of figures. The figures show different examples and do not limit the scope of the invention.

DETAILED DESCRIPTION OF INVENTION

Figure 1:
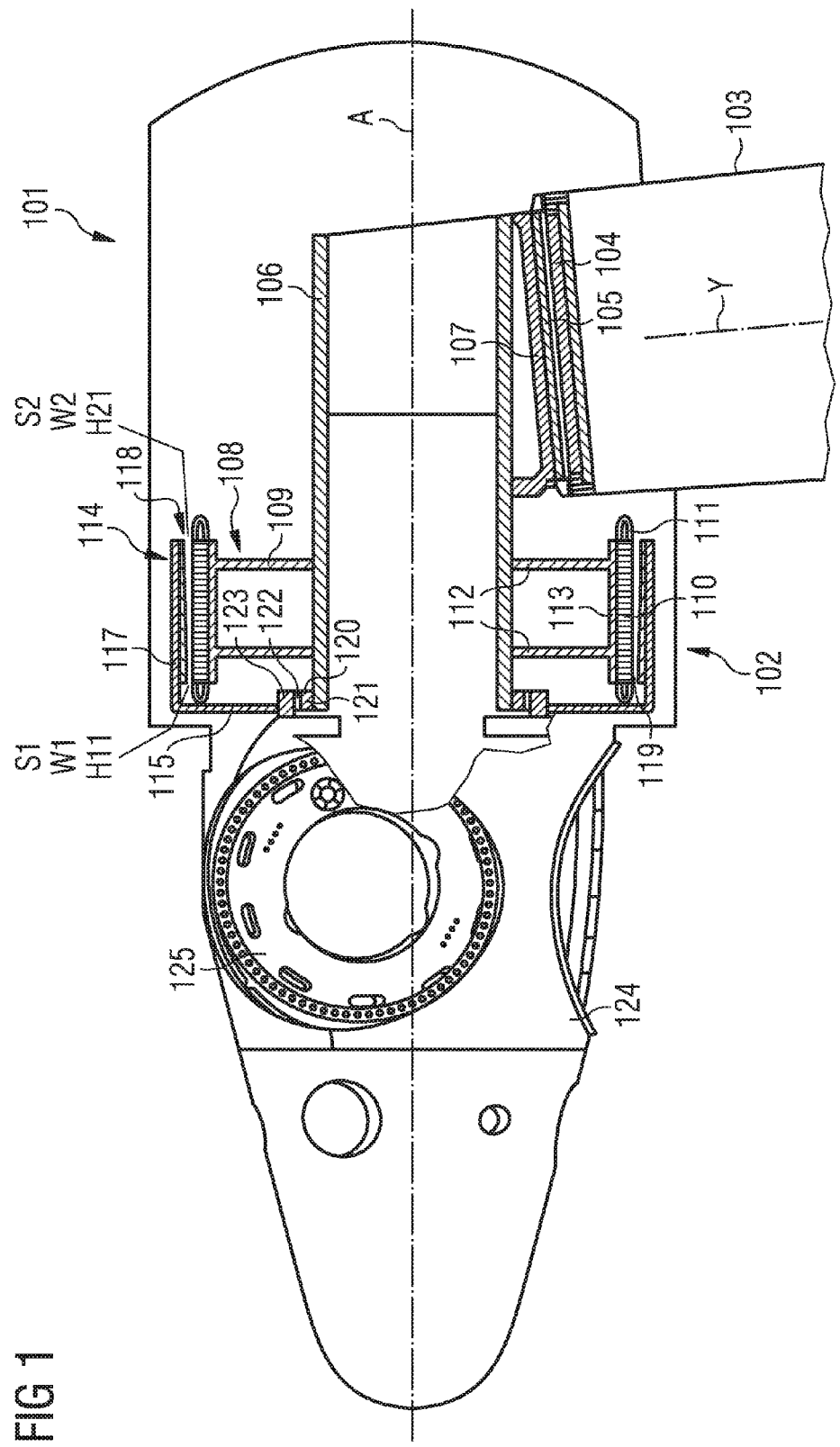
FIG. 1 shows a first configuration according to the invention.

FIG. 1 shows a first configuration according to the invention. A wind turbine 101 comprises a direct drive generator 102, which is arranged on the upwind side of a tower 103 of the wind turbine 101. A tower flange 104 is arranged on the top of the tower 103. A bedplate 105 is attached to the tower flange 104. The wind turbine 101 comprises a yaw system—not shown here—which is used to turn the bedplate 105 of the wind turbine 101 around the axis Y.

The wind turbine 101 comprises a stationary shaft 106, while the shaft 106 has a centre axis A. The rear side of the stationary shaft 106 is attached to a retaining arrangement 107. On the front side of the stationary shaft 106 a stator arrangement 108 of the direct drive generator 102 is arranged.

The stator arrangement 108 comprises a stator support structure 109 and a lamination stack 110. The lamination stack 110 supports at least one winding 111. The stator support structure 109 comprises two support elements 112 for a two side support of the lamination stack 110. The support elements 112 are ring-shaped. They are attached to the outside of the stationary shaft 106.

Figure 2:
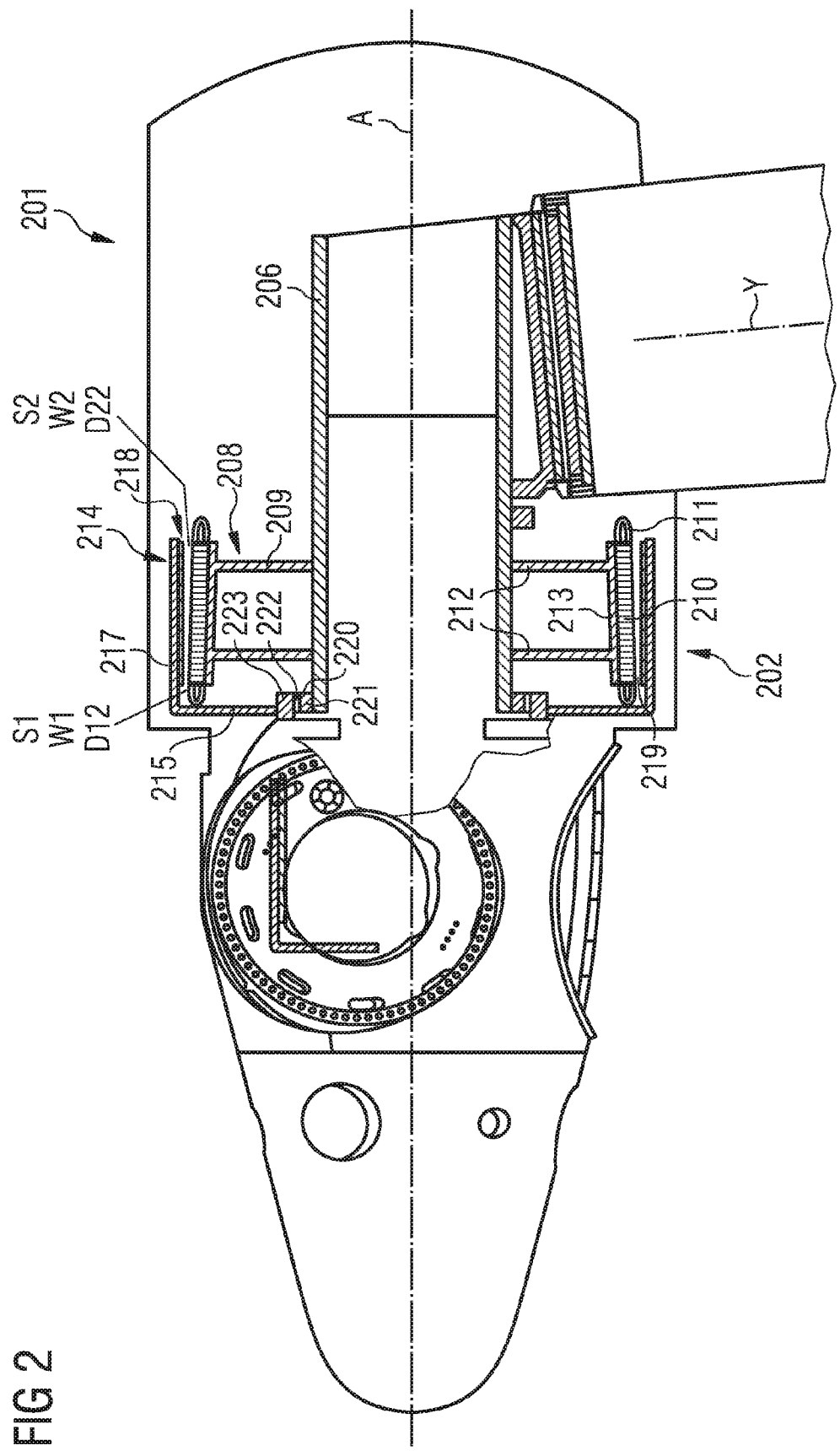
FIG. 2 shows a second configuration according to the invention.

In view to FIG. 2 the ring-shaped support elements 112 show the same diameter and thus the same height of construction.

A hollow cylindrical support element 113 is attached to the outer ends of the ring-shaped support elements 112. The hollow cylindrical support element 113 carries the ring-shaped lamination stack 110 and the windings 111.

A rotor arrangement 114 is arranged around the stator arrangement 108. The rotor arrangement 114 comprises a front endplate 115 and a cylinder element 117. The front endplate 115 is ring-shaped, while the cylinder element 117 is hollow. The cylinder element 117 comprises a plurality of permanent magnets 118, which are mounted on the inside of the hollow cylinder element 117.

The permanent magnets 118 are arranged opposite to the lamination stack 110 and the supported windings. An air gap 119 with a width of approximately 5 mm is located between the permanent magnets 318 and the lamination stack 110.

The front endplate 115 is arranged on the stationary shaft 106 via a bearing 120. The bearing 120 is capable to transform axial loads in both directions of the centre axis A. An appropriate bearing is disclosed in DE 201 16 649 U1 for example.

The stationary part 121 of the bearing 120 is attached to the stationary shaft 106. The rotating part 122 of the bearing 120 is connected to a mounting ring 123. The front endplate 115 as well as the hub 124 are attached to the mounting ring 123. The hub 124 comprises mounting devices 125 for wind turbine rotor blades—not shown here.

According to the invention the permanent magnets 118 show different sizes and thus different heights H11, H21.

A first side S1 of the air gap 119 is adjacent to the front endplate 115. The permanent magnets 118 of this first side S1 show a predefined first height H11. Due to this first height H11 a first width W1 of the air gap 119 is defined.

The first width W1 is calculated and designed in a way that a contact between respective components of the stator arrangement 108 and of the rotor arrangement 114 is prevented if the generator 102 is at work.

A second side S2 of the air gap 119 is opposite to the first side S1. The permanent magnets 118 of this second side S1 show a predefined second height H21, which is smaller than the first height H11. Due to this second height H21 a second width W2 of the air gap 119 is defined.

Due to the position of the bearing-elements 120, 122, 123 the first height H11 is bigger than the second height H21.

The second width W2 is calculated and designed in a way that a contact between respective components of the stator arrangement 108 and of the rotor arrangement 114 is prevented if the generator 102 is at work.

Due to the first width W1 and the second width W2 the air gap 119 shows a non-uniform shape.

This allows compensation and absorption of:
gravity-forces, which act on the components of the rotor,
aerodynamic loads, which are induced from the hub 124 via the shaft 106 to the generator 102,
mass-inertia created by the rotating elements of the generator 102,
magnetic forces, which act on the elements of the generator, or of
vibrations.

Thus the width of the air gap 119 stays within predetermined tolerances, even when the generator is at heavy work.

In view to the next figure FIG. 2 it has to be noted that in FIG. 1 the two support elements 112 for the two side support of the lamination stack 110 show equal lengths or heights H11, H21.

FIG. 2 shows a second configuration according to the invention. A wind turbine 201 comprises a direct drive generator 202, which is arranged on the upwind side of a tower of the wind turbine 201.

The wind turbine 201 comprises a stationary shaft 206, while the shaft 206 has a centre axis A. The rear side of the stationary shaft 206 is attached to a retaining arrangement as described and shown in FIG. 1.

On the front side of the stationary shaft 206 a stator arrangement 208 of the direct drive generator 202 is arranged.

The stator arrangement 208 comprises a stator support structure 209 and a lamination stack 210. The lamination stack 210 supports at least one winding 211.

The stator support structure 209 comprises two support elements 212 for a two side support of the lamination stack 210. The support elements 212 are ring-shaped. They are attached to the outside of the stationary shaft 206.

A hollow cylindrical support element 213 is attached to the outer ends of the ring-shaped support elements 212. The hollow cylindrical support element 213 carries the ring-shaped lamination stack 210 and the windings 211.

A rotor arrangement 214 is arranged around the stator arrangement 208. The rotor arrangement 214 comprises a front endplate 215 and a cylinder element 217. The front endplate 215 is ring-shaped, while the cylinder element 217 is hollow. The cylinder element 217 comprises a plurality of permanent magnets 218, which are mounted on the inside of the hollow cylinder element 217. The permanent magnets 218 are arranged opposite to the lamination stack 210 and the supported windings 211.

An air gap 219 with a width of approximately 5 mm is located between the permanent magnets 218 and the lamination stack 210.

The front endplate 215 is arranged on the stationary shaft 206 via a bearing 220. The bearing 220 is capable to transform axial loads in both directions of the centre axis A. An appropriate bearing is disclosed in DE 201 16 649 U1 for example.

The stationary part 221 of the bearing 220 is attached to the stationary shaft 206. The rotating part 222 of the bearing 220 is connected to a mounting ring 223. The front endplate 215 as well as the hub—in reference to FIG. 1—are attached to the mounting ring 223.

According to the invention the two ring-shaped support elements 212 for the support of the lamination stack 210 show different diameters, so the resulting air gap 219 is non-uniform.

A first side S1 of the air gap 219 is adjacent to the front endplate 215. At the first side S1 the ring-shaped support-element 212 shows a predefined first diameter D12. Due to this first diameter D12 a first width W1 of the air gap 219 is defined.

The first width W1 is calculated and designed in a way that a contact between respective components of the stator arrangement 208 and of the rotor arrangement 214 is prevented if the generator 202 is at work.

A second side S2 of the air gap 219 is opposite to the first side S1. At the second side S2 the ring-shaped support-element 212 shows a predefined second diameter D22, which is smaller than the first diameter D12. Due to this second diameter D22 a second width W2 of the air gap 219 is defined.

Due to the position of the bearing-elements 220, 222, 223 the first diameter D12 is bigger than the second diameter D22.

The second width W2 is calculated and designed in a way that a contact between respective components of the stator arrangement 208 and of the rotor arrangement 214 is prevented during the generator 202 is at operation.

Due to the first width W1 and the second width W2 the air gap 219 shows a non-uniform shape.

This allows compensation and absorption of:
gravity-forces, which act on the components of the rotor,
aerodynamic loads, which are induced from the hub via the shaft 206 to the generator 202,
mass-inertia created by the rotating elements of the generator 202,
magnetic forces, which act on the elements of the generator, or of
vibrations.

Thus the width of the air gap 219 stays within predetermined tolerances.

In view to FIG. 1 it has to be noted that in FIG. 2 the permanent magnets 218 show the same constant size and thus the same heights.

In this configuration the two ring-shaped support elements 212 and the support of the lamination stack 210 build or form a truncated cone.

Figure 3:
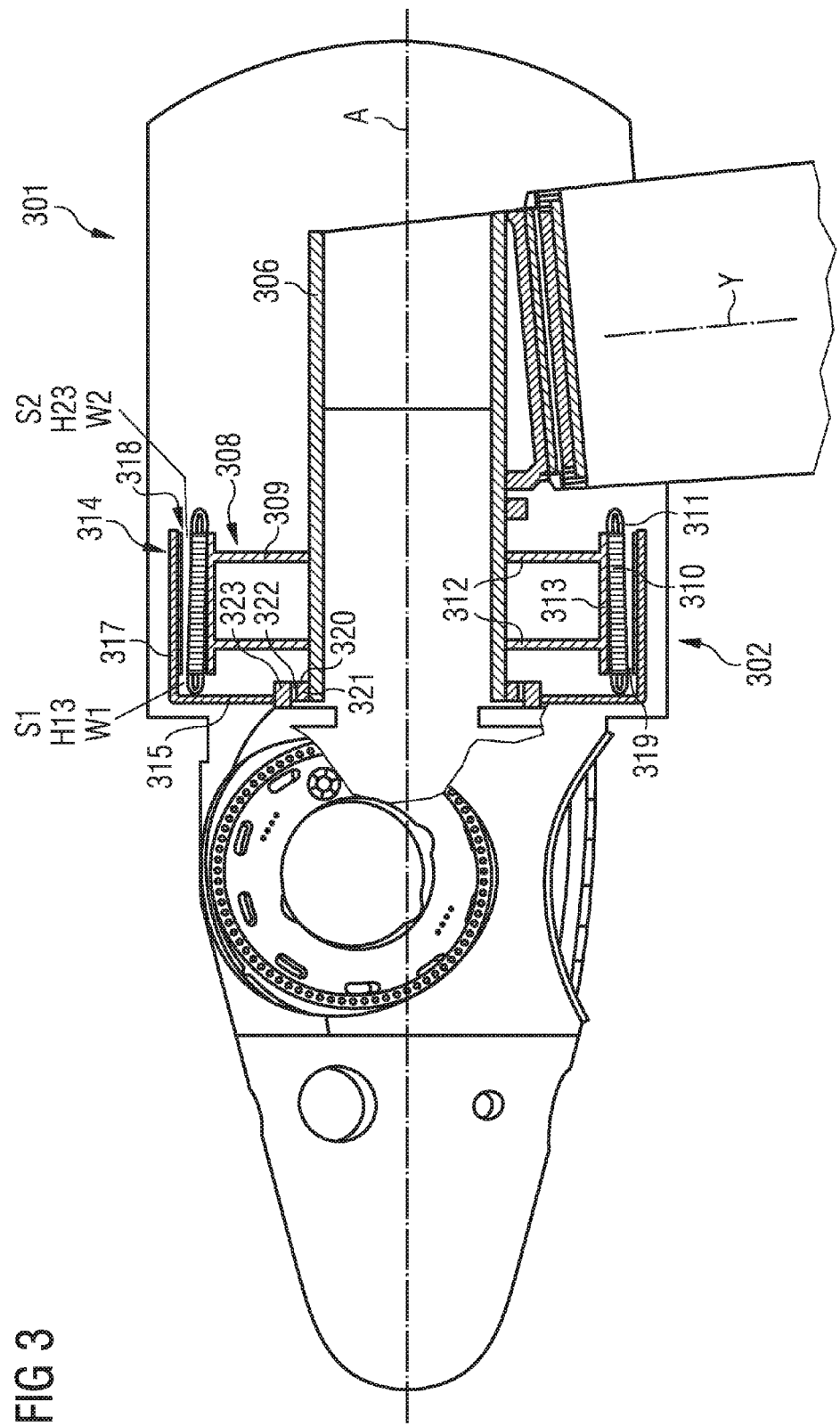
FIG. 3 shows a third configuration according to the invention.
Figure 4:
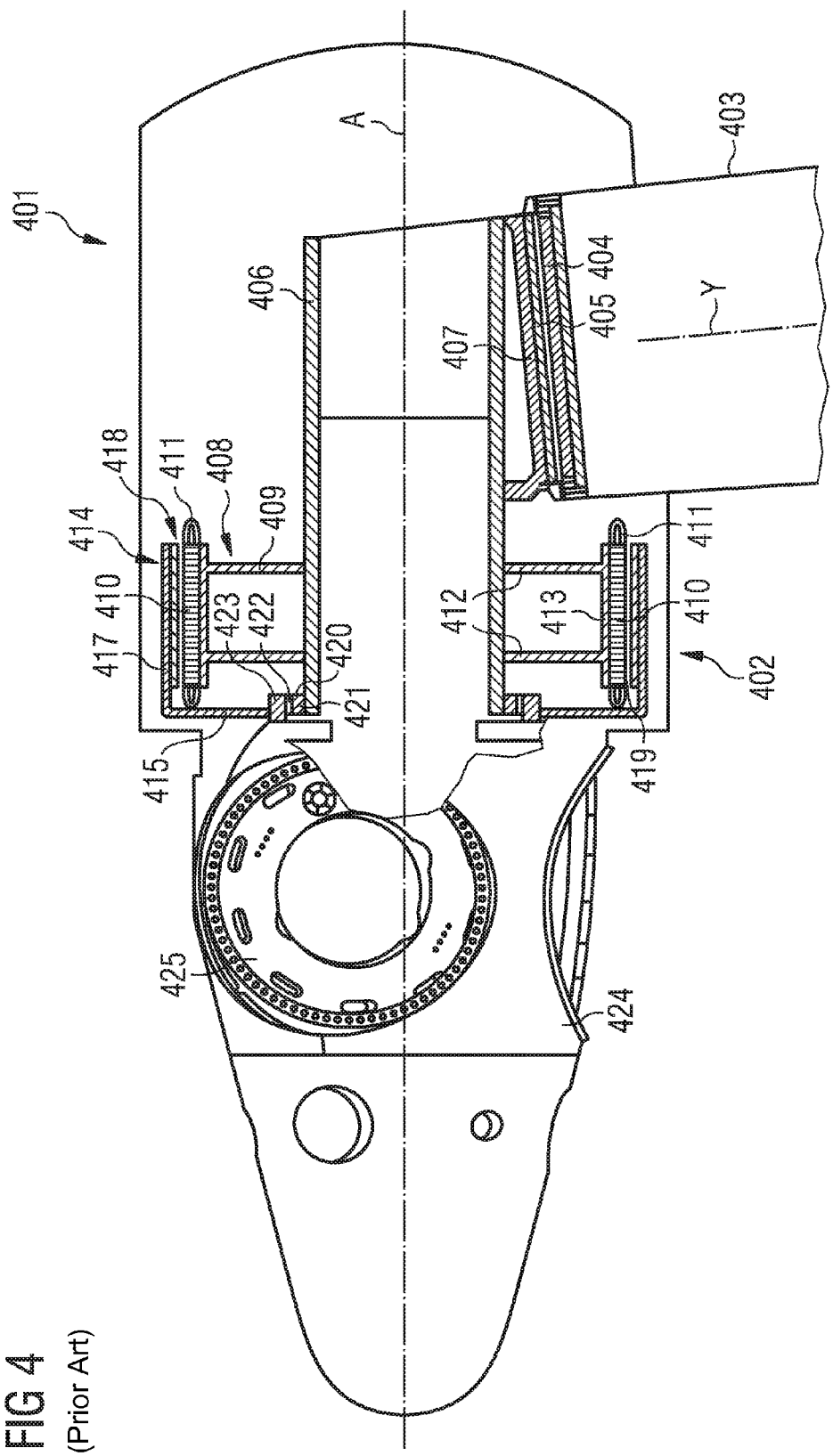
FIG. 4 shows the well established "one-bearing arrangement" of a direct-drive-generator, being described in the introduction of this application.

FIG. 3 shows a third configuration according to the invention. A wind turbine 301 comprises a direct drive generator 302, which is arranged on the upwind side of a tower of the wind turbine 301.

The wind turbine 301 comprises a stationary shaft 306, while the shaft 306 has a centre axis A. The rear side of the stationary shaft 306 is attached to a retaining arrangement as described and shown in FIG. 1. On the front side of the stationary shaft 306 a stator arrangement 308 of the direct drive generator 302 is arranged.

The stator arrangement 308 comprises a stator support structure 309 and a lamination stack 310. The lamination stack 310 supports at least one winding 311.

The stator support structure 309 comprises two support elements 312 for a two side support of the lamination stack 210.

In view to FIG. 2 the support elements 312 are ring-shaped and show the same diameter. They are attached to the outside of the stationary shaft 306.

A hollow cylindrical support element 313 is attached to the outer ends of the ring-shaped support elements 312. The hollow cylindrical support element 313 carries the ring-shaped lamination stack 310 and the windings 311.

A rotor arrangement 314 is arranged around the stator arrangement 308. The rotor arrangement 314 comprises a front endplate 315 and a cylinder element 317. The front endplate 315 is ring-shaped, while the cylinder element 317 is hollow.

The cylinder element 317 comprises a plurality of permanent magnets 318, which are mounted on the inside of the hollow cylinder element 317.

In view to FIG. 1 the permanent magnets 318 show the same size and thus the same height. The permanent magnets 318 are arranged opposite to the lamination stack 310 and the supported windings 311.

An air gap 319 with a width of approximately 5 mm is located between the permanent magnets 318 and the lamination stack 310.

The front endplate 315 is arranged on the stationary shaft 306 via a bearing 320. The bearing 320 is capable to transform axial loads in both directions of the centre axis A. An appropriate bearing is disclosed in DE 201 16 649 U1 for example.

The stationary part 321 of the bearing 320 is attached to the stationary shaft 306. The rotating part 322 of the bearing 320 is connected to a mounting ring 323. The front endplate 315 as well as the hub—in reference to FIG. 1—are attached to the mounting ring 323.

According to the invention the lamination stack 310 shows in reference to its length and along its length different heights. Thus the height of the lamination stack 310 varies along its length in view to the air gap 319. Thus the resulting air gap 319 is non-uniform.

A first side S1 of the air gap 319 is adjacent to the front endplate 315. At the first side S1 the lamination stack 310 shows a predefined first height H13. Due to this first height H13 a first width W1 of the air gap 319 is defined.

The first width W13 is calculated and designed in a way that a contact between respective components of the stator arrangement 308 and of the rotor arrangement 314 is prevented if the generator 302 is at work.

A second side S2 of the air gap 319 is opposite to the first side S1. At the second side S2 the lamination stack 310 shows a predefined second height H23, which is smaller than the first height H13. Due to this second height H23 a second width W2 of the air gap 219 is defined.

Due to the position of the bearing-elements 320, 322, 323 the first height H13 is bigger than the second height H23.

The second width W2 is calculated and designed in a way that a contact between respective components of the stator arrangement 308 and of the rotor arrangement 314 is prevented if the generator 302 is at work.

Due to the first width W1 and the second width W2 the air gap 319 shows a non-uniform shape.

This allows compensation and absorption of:
tolerances in the bearing
gravity-forces, which act on the components of the rotor,
aerodynamic loads, which are induced from the blade and the hub via the shaft 206 to the generator 302,
mass-inertia created by the rotating elements of the generator 302,
magnetic forces, which act on the elements of the generator 302, or of
vibrations.

Thus the width of the air gap 319 stays within predetermined tolerances.

In view to FIG. 1 it has to be noted that the permanent magnets 318 show the same constant size and thus the same heights.

In this configuration the stator arrangement 308 shows different sizes in axial direction along the axis A.

Also combinations of the shown configurations form part of the invention, as long as a non-uniform air gap is established between the stator arrangement and the rotor arrangement, while parts of the rotor arrangement interact with parts of the stator arrangement to generate electrical power.

The air gap is defined by the distance between the parts of the rotor arrangement and the parts of the stator arrangement, while the parts of the stator arrangement are opposite to the parts of the rotor arrangement along a certain length.

The cross-section of the air gap changes along this certain length, so the air gap is not uniform in view to the referred length.

Thus the radial width or the cross section of the air gap changes gradually. Preferably it progresses from an supported end (near the main bearing) of the machine and extends towards an unsupported end of the rotor-stator-arrangement.

The radial width or the cross section of the air gap increases in a step-wise manner, preferably.

Preferably the height of the permanent magnets and/or the height of base plates, which are used to carry the permanent magnets, is/are changed in a stepwise manner.

Preferably the electrical machine comprises an outer-rotor and an inner stator, while the rotor revolves around the stator. The stator arrangement is cylindrical on its outer surface, while the stator arrangement is shaped as a truncated cone on its inner surface.

Preferably the electrical machine comprises an inner-rotor and an outer stator, while the stator revolves around the rotor. The stator arrangement is cylindrical on its inner surface, while the stator arrangement is a truncated cone on its outer surface.

It has to be noted, that the invention is especially suitable for generators, which contains a segmented stator. This generator contains a number of stator-segments, which are connected to the stator at a production-facility or a site for example. This structure is especially suitable for direct drive generators for wind turbines, as they show a typical diameter of 4 meter or more.

Especially the configurations of the invention, which ensure the air gap by adjustments aside the stator are suitable for this kind of generator, as the adjustment can be made easily asides the single stator-segments before they are brought together to form the whole stator.

For example the non-uniform air gap is achieved by a small displacement element or similar, which is placed between the stator segment and the stator support. It is placed in such a way that the outer surface of the whole stator shows a truncated conical shape.

Preferably the stator support is a cylindrical structure, which is machined in conical manner later.

The invention claimed is:

1. An arrangement to ensure an air gap in an electrical machine, comprising:
an electrical machine with a stator arrangement and a rotor arrangement, the rotor arrangement rotating around a longitudinal axis, wherein:
parts of the rotor arrangement interact with parts of the stator arrangement to generate electrical power,
an air gap is defined by a distance between the parts of the rotor arrangement and the parts of the stator arrangement,
the parts of the stator arrangement are opposite to the parts of the rotor arrangement along a certain length,
a cross section of the air gap changes along the certain length such that the air gap is not uniform in view to the referred certain length, the stator arrangement comprises a stator support structure and a lamination stack, the lamination stack is constructed to support a winding of the stator-coil, the stator support structure comprises support elements for a two-sided support of the lamination stack, the support elements being ring-shaped and connected via a single main bearing to the rotor arrangement, outer ends of the ring-shaped support elements are attached to a hollow cylindrical support element, the hollow cylindrical support element carries the ring-shaped lamination stack and the winding, a first side of the air gap is adjacent to a front endplate and a second side of the air gap is opposite to the first side, elements of the ring-shaped support element show different diameters in reference to the longitudinal axis, a first element of the ring-shaped support-element is located at the first side and shows a predefined first diameter, a second element of the ring-shaped support-element is located at the second side and shows a predefined second diameter, and the second diameter is smaller than the first diameter.

2. The arrangement according to claim 1, wherein the permanent magnets show a same size.

3. The arrangement according to claim 1, wherein the stator arrangement and the rotor arrangement are connected via a single main bearing.

4. The arrangement according to claim 1, wherein the electrical machine is a generator.

5. The arrangement according to claim 4, wherein the generator comprises an outer-rotor and an inner stator, the rotor revolving around the stator.

6. The arrangement according to claim 4, wherein:
the generator has a stationary shaft with a centre axis,
the stator arrangement is arranged on an outside of the stationary shaft,
the rotor arrangement is substantially arranged around the stator arrangement,
the rotor arrangement is supported on the stationary shaft by a single main bearing, and
the main bearing is located on the front side of the generator.

7. The arrangement according to claim 4, wherein the generator is a direct-drive-generator, which is located in a wind-turbine.

* * * * *